United States Patent [19]

Umeki

[11] 4,323,464
[45] Apr. 6, 1982

[54] PROCESS FOR PRODUCING HYDRATED IRON OXIDE HAVING SILICON AND PHOSPHORUS COMPONENT

[75] Inventor: Shinji Umeki, Tokyo, Japan

[73] Assignee: TDK Electronics Co., Ltd., Tokyo, Japan

[21] Appl. No.: 143,512

[22] Filed: Apr. 24, 1980

[30] Foreign Application Priority Data

May 11, 1979 [JP] Japan .................................. 54-57021

[51] Int. Cl.$^3$ .............................................. C01G 49/06
[52] U.S. Cl. .............................. 252/62.59; 252/62.56; 252/62.62; 423/633; 423/634
[58] Field of Search ............... 252/62.56, 62.59, 62.62; 423/632, 633, 634

[56] References Cited

U.S. PATENT DOCUMENTS

| | | | |
|---|---|---|---|
| 3,931,025 | 1/1976 | Woditsch et al. | 252/62.56 X |
| 4,082,905 | 4/1978 | Stephan | 252/62.56 X |
| 4,136,158 | 1/1979 | Okuda et al. | 423/634 X |
| 4,201,761 | 5/1980 | Seitzer | 423/634 X |

*Primary Examiner*—Jack Cooper
*Attorney, Agent, or Firm*—Oblon, Fisher, Spivak, McClelland & Maier

[57] ABSTRACT

A hydrated iron oxide comprising a silicon component and a phosphorus component is produced by adding a silicate and a phosphate in an aqueous solution of a base and mixing it with an aqueous solution of a ferrous if necessary with a small amount of zinc ion and oxidizing it under controlling pH in a range of 5.5 to 7.5.

6 Claims, 1 Drawing Figure

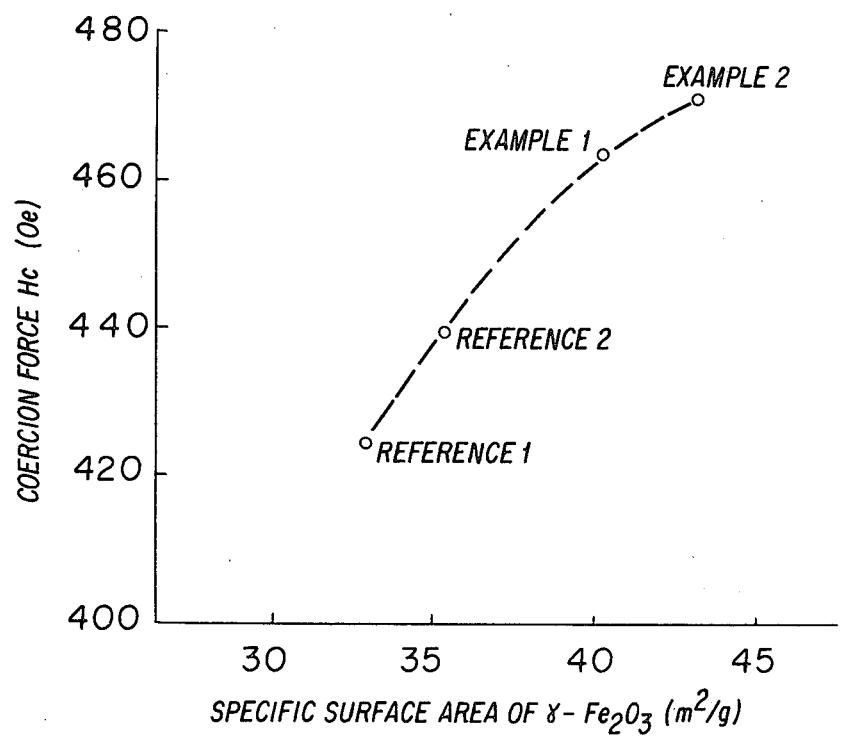

PROCESS FOR PRODUCING HYDRATED IRON OXIDE HAVING SILICON AND PHOSPHORUS COMPONENT

BACKGROUND OF THE INVENTION

1. Field of the Invention

The present invention relates to a hydrated oxide powder comprising hydrated iron oxide as a main component which is used as a raw material for producing a magnetic recording medium having high quality.

2. Description of the Prior Arts

The quality required for a magnetic recording medium is to improve a coercive force suitable for high density recording and to minimize a particle size so as to improve SN ratio.

When the particle size is reduced, a sintering phenomenon is easily caused in a step of converting a hydrated iron oxide into magnetite or $\gamma$-ferric oxide, whereby the coercive force is reduced and a dispersibility is inferior. In order to prevent such sintering phenomenon, it has been proposed to form a silicon compound on the surface of a hydrated iron oxide such as goethite, or to add a phosphate as a pretreatment so as to improve the dispersibility as disclosed in Japanese Unexamined Patent Publication No. 1,44,400/1977 and 129,198/1978.

SUMMARY OF THE INVENTION

It is an object of the present invention to prevent the sintering phenomenon and to prevent the decrease of the coercive force and the deterioration of the dispersibility.

It is another object of the present invention to provide a simple process for producing a hydrated iron oxide which contributes for the improvement of characteristics of a magnetic recording medium.

The foregoing and other objects of the present invention have been attained by providing a process for producing a hydrated oxide powder comprising a hydrated iron oxide as a main component by adding a base and an oxidizing agent to an aqueous solution of ferrous ion as a main component to produce a hydrated oxide comprising a hydrated iron oxide as a main component which is characterized in that a silicate and a phosphate are incorporated in a solution of the base and the oxidation is carried out under maintaining pH of the reaction mixture in a range of 5.5 to 7.5 for most of the oxidation so as to provide the hydrated oxide which can be converted into a magnetic powder having excellent quality without any sintering phenomenon.

BRIEF DESCRIPTION OF THE DRAWING

The FIGURE is a graph showing the relation of increase of the coercive force (Oe) and the specific surface area of $\gamma$-Fe$_2$O$_3$ (m$^2$/g).

DETAILED DESCRIPTION OF THE PREFERRED EMBODIMENTS

The aqueous solution of ferrous ion can be produced by dissolving a ferrous compound such as ferrous chloride, ferrous sulfate, ferrous nitrate etc. in water. A concentration of the ferrous compound is from a saturated concentration to 0.5 wt.% preferably 5 to 40 wt.% especially 10 to 30 wt.%.

The base is preferably sodium hydroxide, carbonate or bicarbonate or potassium hydroxide, carbonate or bicarbonate or ammonium hydroxide.

The concentration of the base is usually 1 to 40 wt.% preferably 5 to 30 wt.%.

The oxidizing agent can be alkali chlorates, air, oxygen, ozone and alkali nitrates. The oxidizing agent is added at a ratio of more than a stoichiometric amount for converting a ferrous compound into a ferric compound. The oxidizing agent can be added before, during or after the mixing of the aqueous solution of ferrous ion with the base, since the oxidation is performed after forming ferrous hydroxide. That is, the oxidizing agent can be mixed with the base or a slurry of ferrous hydroxide. The temperature for the oxidation is usually in a range of 0° to 80° C. preferably 5° to 60° C. especially 20° to 50° C.

The conventional air bubbling oxidation method can be also employed.

The preparation of a hydrated iron oxide can be modified as desired.

The hydrated iron oxide is converted into magnetite by a reduction and magnetite is converted into $\gamma$-ferric oxide by an oxidation. These products are called as the magnetic iron oxide powder.

The hydrated iron oxide is dehydrated by heating it.

The reduction of the hydrated iron oxide or the dehydrated iron oxide is usually carried out at 300° to 600° C. preferably 350° to 400° C. in hydrogen or at 400° to 700° C. in an inert gas with an organic compound such as alcohols, ketones, ethers, esters, hydrocarbons as a reducing agent. The oxidation of the product is usually carried out by heating at 200° to 350° C. preferably 250° to 300° C. in air.

The silicate is shown by the formula

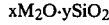

$$xM_2O \cdot ySiO_2$$

wherein M represents a metal preferably an alkali metal or ammonium group. When the silicate is dissolved in an aqueous solution of a base, the silicate is usually converted into an alkali silicate therefore any metal silicate can be used. The typical silicate is an alkali silicate such as sodium, potassium or ammonium silicate.

The phosphate can be orthophosphates, metaphosphates and polyphosphates. When the phosphate is dissolved in an aqueous solution of a base, the phosphate is usually converted into an alkali phosphate, therefore any metal phosphate can be used. The typical phosphate is an alkali phosphate such as sodium, potassium or ammonium phosphate.

The silicate is incorporated at a ratio of 0.05 to 10 wt.%, preferably 0.1 to 5 wt.% as Si based on iron oxide. The phosphate is incorporated at a ratio of 0.05 to 5 wt.%, preferably 0.1 to 2 wt.% as P based on iron oxide.

When a silicate and a phosphate are incorporated, P and Si are incorporated as parts of the crystalline structure of the hydrated iron oxide. This means P and Si are included in the crystal as substituents.

The particles of the magnetite obtained by a reduction of the hydrated iron oxide is usually has a length of 0.1 to 2$\mu$ preferably 0.2 to 1$\mu$ and an acicular ratio of 2 to 40 preferably 5 to 20.

It is considered that silicon and phosphorus components are placed in the crystal of the hydrated oxide obtained by the process of the present invention whereby the desired function and characteristics are attained. The process and product of the present invention are different from those of the conventional process and product.

In the process of the present invention, when a small amount of zinc ion is incorporated in the aqueous solution of ferrous ion as a main component, the reaction for producing the hydrated oxide comprising the hydrated iron oxide as a main component is accelerated and the magnetic characteristics of the magnetic powder obtained from the resulting hydrated oxide are improved.

The substantial difference of the process of the present invention from the conventional process adding a silicon component and a phosphorus component is as follows. In the process of the present invention, a silicon component and a phosphorus component are incorporated during the production of the hydrated oxide comprising the hydrated iron oxide as a main component such as goethite, whereby the silicon and phosphorus components are bonded inside of the crystal of the hydrated oxide. On the other hand, in the conventional process, the silicon and/or phosphorus components are adhered on the surface of the hydrated oxide. The differences of the function and characteristics of the products are resulted by these different structures.

The present invention will be illustrated by certain examples and references which are provided for purposes of illustration only and are not intended to be limiting the present invention.

EXAMPLE 1

Into 2.0 liter of a deionized water, 278 g. of ferrous sulfate was dissolved and the solution was stirred by a stirrer at a temperature of 25° C.±1.0° C. A half of a solution obtained by dissolving 80 g. of sodium hydroxide and 30 g. of potassium chlorate in 1.0 liter of a deionized water, was gradually added during about 1 minute to the former solution. During the addition, pH of the solution was suddenly increased from about 3.0 to about 7.5 and then pH was gradually decreased to about 6.1 after 15 minutes. After 30 minutes, a solution obtained by dissolving 3.0 g. of sodium silicate solution (about 28% of $SiO_2$ component) and 0.30 g. of sodium metaphosphate in said remained solution of sodium hydroxide and potassium chlorate was added to the reaction mixture at a rate of 2 ml per minute by a pump. It took about 250 minutes for completing the addition. During the addition, the reaction mixture was stirred and the pH change of the reaction mixture was automatically recorded. After about 200 minutes, the pH was gradually increased to 6.4–6.5. The color of the precipitate was changed from blueish black to dark green and then further changed through yellowish blue to yellow. The end point of the reaction should be conformed with the addition of the stoichiometric quantity of the base required for neutralizing ferrous sulfate. In the practice, the pH change was monitored and controlled to give about 7.0 with a small amount of the aqueous solution of a base.

In this example, about 10 ml. of 2 N-NaOH aqueous solution was added 20 minutes before the end of the reaction so as to complete the reaction for 300 minutes. At the end of the reaction, the pH was 7.02. The resulting slurry of goethite was washed five times with water in a 100 liter tank by a decantation method, and then, it was filtered and dried at 70° C. for 24 hours and pulverized to obtain about 86 g. of goethite powder. It was confirmed that most of the powder was made of goethite ($\alpha$-FeOOH) by X-ray diffraction method. It was also confirmed that the powder was made of acicular crystals having an average length of about 0.3$\mu$ and an acicular ratio of about 10 by an electron microscopic observation. It was also confirmed that the powder had a specific surface area of 56.7 $m^2/g$. by the BET method. It was also confirmed that the powder contains 0.85 wt.% of $SiO_2$ component and 0.15 wt.% of phosphorus component by the fluorescent X-ray elemental analysis.

In a quartz boat, 10 g. of the resulting goethite powder was charged and the port was set in a reducing furnace. Firstly, it was heated at about 600° C. in air for 1 hour to perform a dehydration and a heat treatment. (The heat treatment at 600° C. results in an improvement of crystalline state and an improvement of magnetic characteristics of $\gamma$-$Fe_2O_3$ obtained by a reduction and an oxidation of the product). Nitrogen gas was fed into ethanol in bubbling and was continuously fed into the reducing furnace at a flow rate of 0.3 liter/min. and the powder was reduced at 400° C. for 1 hour to obtain magnetite. The magnetite was cooled and then heated at 300° C. for 1 hour in air to obtain $\gamma$-ferric oxide.

Magnetic characteristics of the resulting $\gamma$-ferric oxide were measured. The results are as follows.

| | |
|---|---|
| Coercive force (Hc) | 465 Oe |
| Intensity of Saturated magnetization (sigma S) | 73.7 emu/g. |
| Intensity of Residual magnetization (sigma R) | 36.9 emu/g. |

The specific surface area measured by the BET method was 40.2 $m^2/g$.

According to an electron microscopic observation, it was confirmed that a sintering of the particles was not substantially found. The coercive force is varied depending upon a packing density and accordingly, it was calibrated to the value in the condition of 0.50 g/ml.

EXAMPLE 2

In accordance with the process of Example 1, except adding 10 ml. of 1.0 mole aqueous solution of zinc chloride to the aqueous solution of ferrous sulfate, the reaction and the treatment were carried out under the same condition with the same components to obtain the goethite containing zinc component.

When zinc ion was added, the reaction velocity was slightly increased to complete the reaction for about 50 minutes shorter than that of Example 1. According to the electron microscopic observation, the size of the particles was slightly smaller than that of Example 1 and the acicular ratio of the particles was slightly higher than that of Example 1. The specific surface area measured by the BET method was 67.1 $m^2/g$.

In accordance with the process of Example 1, the product was dehydrated, reduced and oxidized to obtain $\gamma$-ferric oxide. Magnetic characteristics of the $\gamma$-ferric oxide are as follows.

| | |
|---|---|
| Coercive force (Hc) | 471 Oe |
| Intensity of Saturated magnetization (sigma S) | 73.3 emu/g. |
| Intensity of Residual magnetization (sigma R) | 36.5 emu/g. |

The specific surface area measured by the BET method was 43.5 m²/g.

REFERENCE 1

In accordance with the process of Example 1 except eliminating the sodium silicate solution and sodium metaphosphate from the aqueous solution of sodium hydroxide and potassium chlorate, the reaction and the treatment were carried out to obtain a goethite; and then the product was dehydrated, reduced and oxidized to obtain γ-ferric oxide, and magnetic characteristics of γ-ferric oxide were measured. The results are as follows.

| Coercive force (Hc) | 423 Oe |
| --- | --- |
| Intensity of Saturated magnetization (sigma S) | 75.6 emu/g. |
| Intensity of Residual magnetization (sigma R) | 38.1 emu/g. |

The specific surface area measured by the BET method was 32.7 m²/g.

REFERENCE 2

In the slurry of goethite obtained by the reaction for the production of goethite in Reference 1, a small amount of 2 N-H₂SO₄ solution was added to adjust pH to 3.4 and 30 ml. of 1.0% aqueous solution of sodium metaphosphate was added. After stirring the mixture for 60 minutes, a small amount of 2 N-NaOH solution was added to adjust pH to 8.5 and then 30 ml. of aqueous solution containing 3.0 g of sodium silicate solution (about 28% of SiO₂ content) was added and the mixture was stirred for 60 minutes. Finally, a small amount of 2 N-H₂SO₄ solution was added to adjust pH to 4.2 and the mixture was stirred for 60 minutes.

In accordance with the process of Example 1, the product was washed with water, filtered, dried and pulverized to obtain 87 g. of goethite, and then, the product was dehydrated, reduced and oxidized to obtain γ-ferric oxide. Magnetic characteristics of γ-ferric oxide are as follows.

| Coercive force (Hc) | 440 Oe |
| --- | --- |
| Intensity of Saturated magnetization (sigma S) | 74.1 emu/g. |
| Intensity of Residual magnetization (sigma R) | 37.2 emu/g. |

The specific surface area measured by the BET method was 35.1 m²/g.

The FIGURE is a graph showing the relations of the specific surface area of γ-ferric oxide (γ-Fe₂O₃) and the coercive forces (Hc) obtained in Examples 1 and 2 and References 1 and 2. As it is clearly found in the FIGURE, the product obtained in Example 1 (obtained by the process of the present invention) had superior coercive force and specific surface area to those of the products obtained in Reference 1 (no addition of a silicate and a phosphate) and Reference 2 (the conventional process adding a silicate and a phosphate).

The goethites obtained by the processes of Example 1, References 1 and 2 had substantially the same shape and the same size and the same specific surface area. The conditions of the dehydration, reduction and oxidation are the same. Therefore, the coercive forces and the specific surface areas should be different because of differences of the effects for preventing the sintering of goethites in the conversion from the goethites into γ-ferric oxides.

In Example 2, a small amount of the zinc component was added so as to improve the shape of the particles and to decrease the particle size. The product of Example 2 had superior coercive force and specific surface area to those of Example 1 whereby the product of Example 2 is superior to that of Example 1 as a source for a magnetic recording medium having high quality.

The reason of the result that the product of Example 1 is superior to that of Reference 2 is not clarified, but it is considered that the phosphorus and silicon components which are effective for preventing the sintering are placed in the crystal in Example 1 whereas they are adhered on only the surface of the crystal in Reference 2.

In comparison of the process of the addition of the phosphate and the silicate and the treatment, the process of the present invention is remarkably simpler than that of the conventional process. Even though it is considered only from said viewpoint. The cost for the production can be remarkably saved and the industrial advantage is remarkably high in the process of the present invention.

In Examples 1 and 2, the phosphate and the silicate are added after the addition of 50% of the solution of the base, however, it is possible to add the phosphate and the silicate at the beginning. It is not always necessary to add the phosphate and the silicate after adding 50% of the solution of the base. Thus, the shape and size of the particles of goethite are slightly varied depending upon the time of the addition of the phosphate and the silicate. Therefore, the time for the addition should be considered.

The ranges of the amount of the phosphate and the silicate are respectively from 0.05% to 5%. When it is less than 0.05%, the effect is not remarkable whereas when it is more than 5%, the shape and the size are varied and the intensity of magnetization is decreased. These are disadvantageous.

What is claimed is:

1. A hydrated iron oxide powder which consists essentially of:
   goethite;
   a silicon component in an amount of 0.05 to 10 weight %, as Si based on the iron oxide; and
   a phosphorus component in an amount of 0.05 to 5 weight %, as P based on the iron oxide;
   wherein silicon and phosphorus are incorporated in the crystal structure of the iron oxide.

2. The hydrated iron oxide powder according to claim 1, wherein the silicon component is present in an amount of 0.1 to 5 weight %, as Si based on the iron oxide.

3. The hydrated iron oxide powder according to claim 1, wherein the phosphorous component is present in an amount of 0.1 to 2 weight %, as P based on the iron oxide.

4. A process for producing a hydrated iron oxide powder consisting essentially of
   goethite;
   a silicon component in an amount of 0.05 to 10 weight %, as Si based on the iron oxide; and
   a phosphorus component in an amount of 0.05 to 5 weight %, as P based on the iron oxide;
   wherein silicon and phosphorus are incorporated in the crystal structure of the iron oxide;

the process comprising:
adding a base to an aqueous solution of ferrous ion; and oxidizing the so-formed admixture, while maintaining the pH of the admixture in the range of 5.5 to 7.5;
wherein a silicate and a phosphate are present in said admixture during oxidation.

5. The process according to claim 4, wherein the silicate and phosphate are present in the base added to the aqueous solution of ferrous ion.

6. The process according to claim 4, wherein the silicate and phosphate are present in additional base which is added during the oxidation so as to maintain the pH in the desired pH range.

* * * * *